D. P. COLLINS.
SPEED CHANGING AND TRANSMISSION GEARING.
APPLICATION FILED APR. 1, 1911.
1,033,083.
Patented July 23, 1912.
2 SHEETS—SHEET 1.
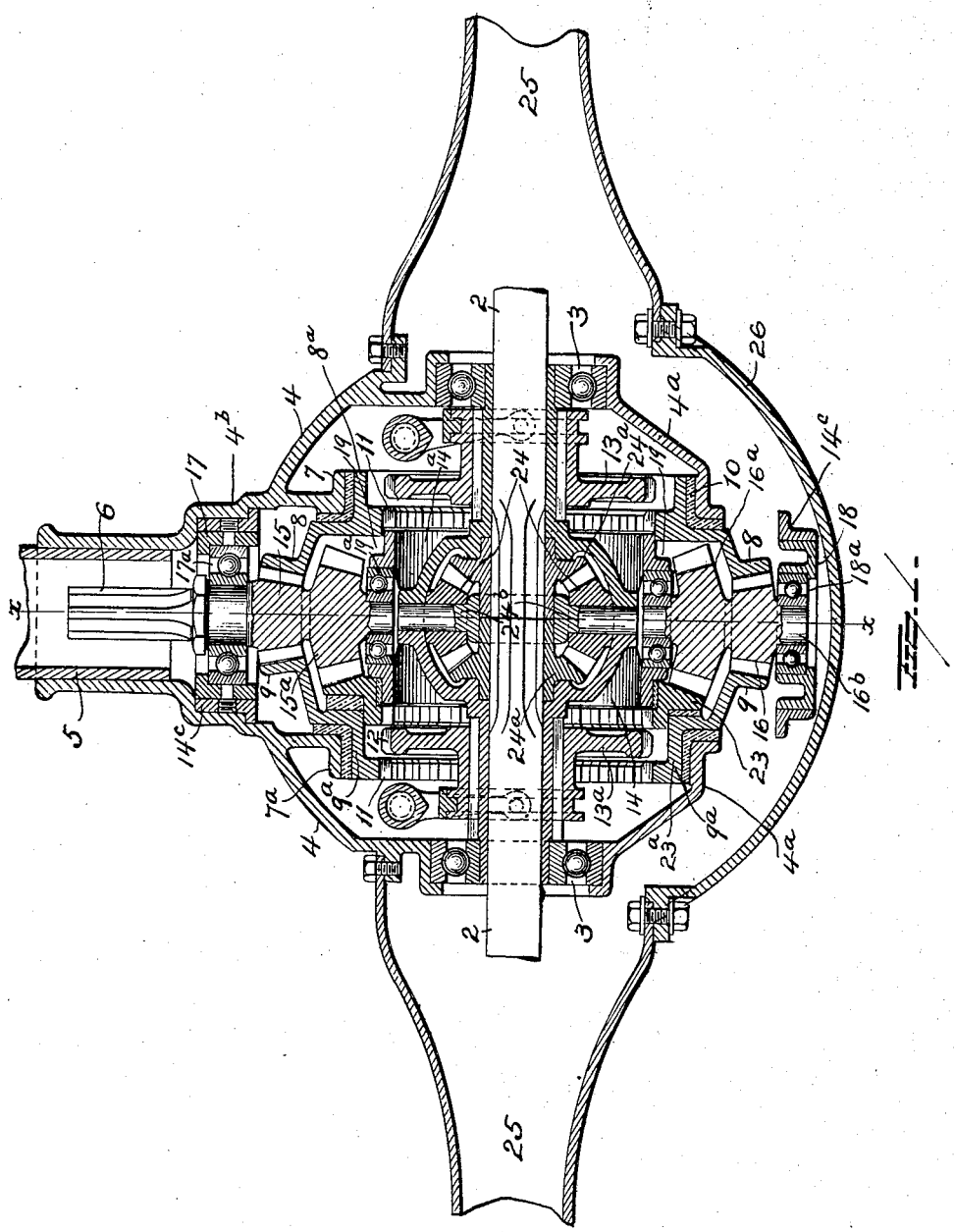
WITNESSES
INVENTOR
Attorney

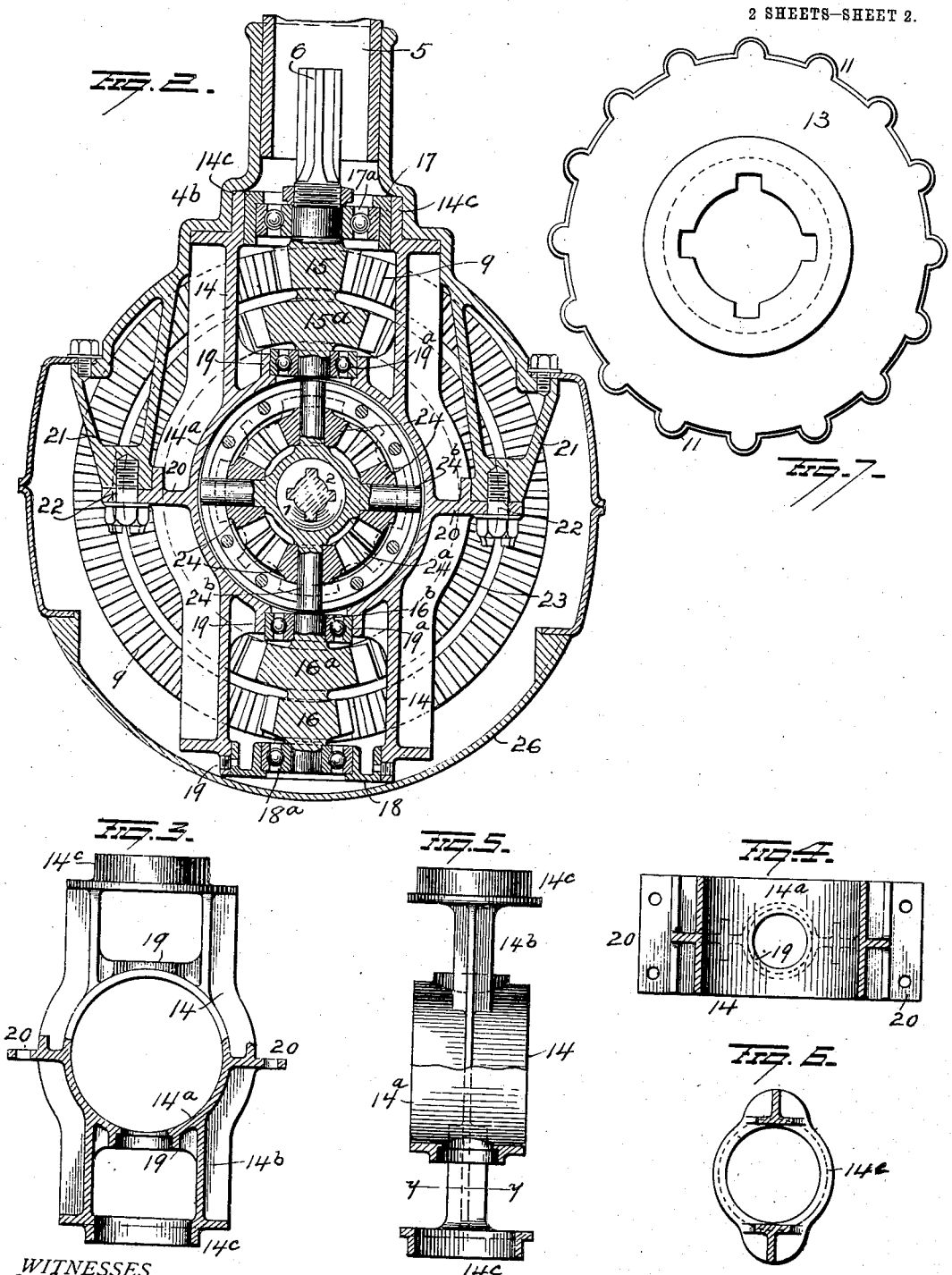

UNITED STATES PATENT OFFICE.

DENNIS P. COLLINS, OF PITTSBURGH, PENNSYLVANIA.

SPEED-CHANGING AND TRANSMISSION GEARING.

1,033,083.

Specification of Letters Patent. Patented July 23, 1912.

Application filed April 1, 1911. Serial No. 618,478.

*To all whom it may concern:*

Be it known that I, DENNIS P. COLLINS, of Pittsburgh, in the county of Allegheny and State of Pennsylvania, have invented certain new and useful Improvements in Speed-Changing and Transmission Gearing; and I do hereby declare the following to be a full, clear, and exact description of the invention, such as will enable others skilled in the art to which it appertains to make and use the same.

My invention relates to an improvement in speed changing and transmission gearing, the object being to so construct the gears that the power is applied to the gear that is clutched to the axle, through all the other gears of the series both forward and reverse, at all times.

A further object is to provide improved means for mounting the several gears so that they may be assembled on the outside and then placed within their casing.

With these and other objects in view my invention consists in the parts and combinations of parts as will be more fully described and pointed out in the claims.

In the accompanying drawings, Figure 1 is view in horizontal section of my improved gearing and its housing. Fig. 2 is a view in vertical section on the line $x$—$x$ of Fig. 1. Fig. 3 is a view in elevation partly in section of the inner housing. Fig. 4 is a view in transverse section of Fig. 3. Fig. 5 is a view in elevation and section of the inner housing taken at right angles to Fig. 3. Fig. 6 is a view in section on the line $y$—$y$ Fig. 5, looking toward the adjacent end of the frame, and Fig. 7 is a view of one of the clutch members.

1 represents the rear axle sleeve covering and embracing the inner ends of the two sections 2 of the rear axle. This sleeve is mounted at its ends in the ball bearings 3 carried by the two part cast metal casing and frame 4 and 4ᵃ. This combined casing and frame forms part of the housing and support for the gears, and is attached at its front end to the rear end of sleeve 5, which incloses the drive shaft 6. This casing and frame 4 and 4ᵃ, is provided with two cylindrical annular bearings 7 and 7ᵃ which carry respectively the reverse and slow speed gears 8 and 9, suitable lining 10 such as Babbitt metal being interposed between the bearings 7 and 7ᵃ and the hubs 8ᵃ and 9ᵃ of the gears 8 and 9. These hubs, as clearly shown in Fig. 1 are open at their centers, and are provided with inwardly projecting teeth 11 which are adapted to be engaged by the teeth 12 of the clutch members 13 and 13ᵃ. The teeth on the hubs of the gears and also on the clutch members are rounded as shown in Fig. 7. This form of tooth which is as effective as the angular tooth, may be finished in a forging process, thus saving the expense of machine work.

The front section 4 and the rear section 4ᵃ of the casing or frame, are bolted together in the plane of the axles 2, and when assembled form, as shown, continuous bearings which embrace and support the hubs of the gears 8 and 9.

14 is the inner frame, carried by the front section 4 of the outer casing or frame, and carrying the drive pinions 15 and 15ᵃ and secondary driving pinions 16 and 16ᵃ. This frame 14 as shown in Fig. 2, is provided with a cylindrical central section 14ᵃ, and end extensions, the shape and construction of which are fully shown in Figs. 3 to 6. Each end extension comprises two arms integral with the central section, terminating in an integral cylindrical collar 14ᶜ. The front collar 14ᶜ rests within a cylindrical bearing 4ᵇ, (shown in Figs. 1 and 2) in the front part 4 of the frame or casing, and supports the ring 17 in which the ball bearings 17ᵃ are carried, the said ball bearing supporting the rear end of drive shaft 6, while the rear collar 14ᶜ carries the cap 18, in which the ball bearings 18ᵃ for the secondary driving pinions are mounted, the said cap being secured to the collar by screws 19. The inner frame 14 is also provided at diametrically opposite points, (front and rear,) on the central cylindrical section 14ᵃ, with seats 19 for the ball bearings 19ᵃ, one of which supports the rear end of the drive shaft 6, and the other supports the front end of the shaft 16ᵇ, carrying the secondary driving pinions 16 and 16ᵃ. This frame 14 is also provided at diametrically opposite points (top and bottom) with lugs 20, which engage the brackets 21 integral with the front section 4 of the frame or casing, and are secured thereto by the bolts 22 as shown in Fig. 2; hence it will be seen that by simply removing these bolts, the inner frame 14 and all parts carried thereby, can be withdrawn rearwardly from the front section 4 of the main frame or casing.

Mounted on the periphery of the cylindrical portion 14ª of the inner frame, at one side thereof, is the high speed transmission gear 23, a suitable bushing of Babbitt or other metal being interposed between the part 14ª and the hub or gear 23. The hub 23ª of this gear 23 also projects into the hub of slow speed gear 9 and assists in supporting, and is also partly supported by the latter.

The rear axle sleeve 1 is enlarged at its center, as shown in Fig. 1, to receive and form a housing for the differential gears 24 and 24ª the former of which are mounted on the shafts 24ᵇ carried by the sleeve 1, and the latter are secured respectively to the abutting ends of the two sections of the rear axle 2, and operate in the usual and well known manner.

The hubs of clutch members 13 and 13ª are keyed to sleeve 1 so as to impart rotary movement thereto, the clutch member 13 being adapted to clutch the reverse gear 8 to the sleeve, and the clutch member 13ª adapted to clutch either the high or low speed transmission gears 23 and 9 to the sleeve, the hub of the former being open and toothed so as to be engaged by the teeth on clutch member 13ª. The clutches are provided with shifting means, both of which are actuated by a single lever, which however forms no part of this invention.

The drive pinion 15 on shaft 6 meshes with the slow speed and reverse gears 9 and 8, and rotates both, but as only one can be clutched to the sleeve at a time, motion from the drive shaft will be imparted to the sleeve and from the latter to the rear axle, through the gear that is clutched to the sleeve. Drive pinion 15 meshes with the high speed gear 23 and drives same. Clutch 13ª, is, as shown designed to connect either the high or low speed transmission gears to the sleeve, but not both at the same time, and when in its neutral position, shown in Fig. 1 both gears will be disconnected from the axle sleeve. Secondary driving pinion 16 meshes with the low speed transmission gear 9 and reverse gear 8, while secondary pinion 16ª meshes with the high speed transmission gear. By the direct drive as shown, and by the employment of the secondary pinions, I provide, in effect a continuous chain of gearing, whereby the low speed gear assists in driving when the reverse is clutched up, and the reverse assists in driving when the low speed gear is locked to the sleeve. Also when the high speed is clutched, the reverse gear assists in driving through the secondary pinions 16 and 16ª.

The sleeve 1 with its clutch members and inclosed differential gearing are assembled and placed in position within the inner frame, and the high and low speed and reverse gearing and drive and secondary pinions are assembled on the inner frame, and the latter, carrying a section of the drive shaft 6, is inserted in the front section 4 of the outer casing or frame and is secured thereto by the bolts 22 shown in Fig. 2. After the inner frame and gearing have been so placed, the rear section 4ª of the outer frame or casing is passed over the rear extension 14ᵇ of the inner frame and is then secured by bolts or screws to the section 4 of the outer casing or frame, and assist in supporting the gears, the annular bearings on said rear section 4ª, being continuous with those on the front section 4. After the parts have been thus assembled the axle sections are inserted and the stub end of drive shaft 6 coupled up to the main section of the drive shaft. It will also be apparent that by withdrawing the axles and removing the back cap 26 and the rear section 4ª of the casing that the assembled gearing may be removed.

Pressed steel hollow axles 25 are secured to the front section 4 of the casing or frame and cover the axle sections 2, and support the frame 4 and 4ª and contained gearing, and carries the back cap 26 which latter is removably secured in place, the opening closed thereby being of a size sufficient to permit the inner frame and gearing carried thereby to be placed in position and removed, when the cap is removed. This cap operates to exclude dirt and retain the lubricating oil. Hollow axle 25 is continuous from end to end, but is split in the center and separated as shown in Fig. 2, for the introduction of the gear casing between the sides thereof.

With the construction as shown the high speed gear is mounted on the central portion of the inner frame, and in the hub of the low speed gear, while the latter is mounted directly in a cylindrical bearing in the two part outer frame and on the hub of the high speed gear. These gears are therefore supported by both frames and by each other. The reverse gear, is, in the present instance supported almost wholly by the outer frame, and is held in position by the pinion, but it is clearly evident that it may bear to a greater extent than is shown on the cylindrical section of the inner frame.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. The combination with a two part outer frame or casing and an inner frame detachably secured to one part of the outer frame, of high and low speed gearing supported by said inner and outer frames, a drive shaft having bearing in the inner removable frame and pinions on said shaft, meshing with said high and low speed gears.

2. The combination with a two part outer frame or casing and an inner hollow frame detachably secured to one part of said outer frame, of high and low speed gears supported by inner and outer frames, a drive shaft having bearing in the inner removable frame, pinions on said shaft meshing with said gears, and a shaft mounted in the inner frame and fixed pinions thereon which mesh respectively with said high and low speed gears.

3. The combination with a two part outer frame or casing and an inner frame secured to one part of the outer frame, of high and low speed gears carried by and between the said inner and outer frames, a reverse gear mounted in the outer frame, and main and secondary driving pinions connecting the forward drive gears with the reverse gear.

4. The combination with an axle, an outer frame or casing, and an inner frame secured to said outer frame, of high and low speed gears carried by and between said inner and outer frames, a reverse gear mounted within the outer frame, main and secondary driving pinions carried by the inner frame and connecting the several gears, and two clutches, one for locking the reverse gear to the axle and the other for locking the high and low speed gears to the axle.

5. The combination with an outer frame, an inner frame detachably secured therein, a sleeve passing through the inner frame, and supported by the outer frame, and an axle connected with said sleeve, of high and low speed gears located within the outer frame and outside the inner frame and supported by both, a reverse speed gear within the outer frame, main and secondary driving pinions carried by said inner frame, and meshing with the high and low speed and reverse gears, and clutches for locking said gears to the sleeve.

6. The combination of an outer frame having oppositely disposed cylindrical bearings, a gear mounted in each bearing, an inner frame interposed between said gears and secured to the outer frame, a gear mounted on a cylindrical bearing of the inner frame, and main and supplementary drive pinions carried by said inner frame and meshing with the forward drive and reverse gears whereby all the gears rotate simultaneously and each assists in driving the others.

7. The combination with an outer frame or casing and an inner frame secured to said outer frame, of high and low speed gears and a reverse gear within the outer casing outside the inner frame, main and secondary drive pinions carried by the inner frame and meshing with said gears, an axle sleeve mounted in the outer frame and passing through the inner frame, clutches mounted on said sleeve for locking the several gears thereto, an axle within the sleeve and means connecting the sleeve and axle.

8. The combination with an outer frame or casing and an inner frame secured to said outer frame, of high and low speed gears within the outer frame and outside the inner frame, and supported by both, main and supplementary drive pinions carried by the inner frame and meshing with said gears, an axle sleeve mounted in the outer frame and passing through the inner frame, clutches carried by said sleeve for locking the gears thereto, axle sections within the sleeve and differential gears connecting said sleeve and axle sections.

9. In apparatus of the class described, a drive shaft, an axle or shaft to be driven, a pair of pinions of different size connected with the drive shaft, a casing made up of separable members, a high and a low speed gear bearing in the casing, a reversing gear having a bearing in the casing and meshing with one of the pinions, and means for connecting the gears to the driven shaft or axle, one portion of said casing being removable with its bearings.

10. In apparatus of the class described, a drive shaft, an axle or shaft to be driven, a pair of pinions of different size connected with the drive shaft, a casing made up of separable members, a high and a low speed gear bearing in the casing, a reversing gear having a bearing in the casing and meshing with one of the pinions, and means for connecting the gears to the driven shaft or axle, said means consisting of clutch disks slidable axially of the driven shaft and engaging the gears which are of annular form, one portion of the said casing being removable with a part of the gear bearing.

11. In combination in apparatus of the class described, a drive shaft, a driven shaft or axle, a pair of pinions on the drive shaft, a casing, a gear having its bearing in the casing and meshing with one of the pinions, a gear meshing with the other pinion, a bearing within the casing for said second gear, said gear having a bearing also on the first gear, and means for connecting either gear with the driven shaft or axle.

12. In combination in apparatus of the class described, a drive shaft, a driven shaft or axle composed of two members, differential gearing at the meeting ends of the two members, a casing for said differential gearing surrounding the shaft sections, pinions connected with the drive shaft, annular gears meshing therewith, and on each side of the differential gearing, clutch means between the differential casing and said gears, a gear casing made up of separable members, said gears and differential casing bearing in said gear casing and removable with a portion of the same.

13. In combination in apparatus of the class described, a drive shaft, a driven shaft or axle, change speed gearing between the drive and driven shafts, a casing for said gearing having a removable cap at the rear, said gearing being removable through the opening at the rear of the casing left by said cap.

14. In combination in apparatus of the class described, a drive shaft, a driven shaft or axle, change speed and differential gearing between the said shafts, a casing for the gearing, said change speed and differential gearing being removable as one body by withdrawing the same rearwardly in line with the axis of the drive shaft.

15. In combination in apparatus of the class described, a drive shaft, a driven shaft or axle, gearing between the same, a casing, and a frame or yoke removably mounted in the casing and having bearings for the gearing.

16. In combination in apparatus of the class described, a drive shaft, a driven shaft or axle, gearing between the same, a casing having a removable cap at its rear, a yoke or frame bearing in said cap and in the main part of the casing, and removable when the cap of the casing is removed, said frame or yoke having bearings for the gearing which gearing is removable through the rear of the casing.

17. In combination a drive shaft, a driven shaft, or axle, pinions connected with the drive shaft, gears meshing with the pinions, a second pair of pinions meshing with the gears, a casing having a removable cap with bearings for said gears between the cap and the main part of the casing, and a yoke or frame removably mounted in the casing and having bearings for both sets of pinions.

18. In combination the drive shaft, a driven shaft, pinions on the drive shaft, gears meshing with said pinions, means for clutching said gears to the driven shaft, a casing, and a frame removably held in the casing and having a bearing for the pinions.

19. In combination the drive shaft, a driven shaft, pinions on the drive shaft, gears meshing with said pinions, means for clutching said gears to the driven shaft, a casing, and a frame removably held in the casing and having a bearing for the pinions, said casing having a removable cap with bearings between the same and the main portion for the gears.

20. In combination a drive shaft, a two-part driven shaft, differential gearing on the two-part shaft, a casing for the differential gearing, pinions on the drive shaft, gearing meshing with said pinions, pinions meshing with said gearing at a point opposite the first mentioned pinions, clutch means between said gearing and the differential gear casing, a casing inclosing the gearing, and a frame removably held at its ends in the casing having bearings for both sets of pinions and having an enlarged central portion receiving the differential casing.

21. In combination the drive shaft, the two-part driven shaft or axle, differential gearing at the meeting ends of the two-part axle, a casing for the differential gearing, pinions connected to the drive shaft, gears meshing with said pinions, clutch means for connecting said gears with the differential casing, a gear case, having a removable cap with bearings between the same and the main part of the casing for the said gearing and for the differential case, a second pair of pinions meshing with the gears and a frame or yoke bearing at one end in the main part of the casing and at its other end in the removable cap and having bearings for the two sets of pinions and a central opening receiving the differential casing.

22. In combination a drive shaft, a two-part driven axle, change speed gearing between the driving shaft and axle, a reversing gear between the driving shaft and the axle, differential gearing on the axle between the change speed and reversing gears, supporting means for the gearing and a coupling between the gearing and the driving shaft permitting the gearing as one body to be removed rearwardly by a movement in line with the axis of the drive shaft.

In testimony whereof, I have signed this specification in the presence of two subscribing witnesses.

DENNIS P. COLLINS.

Witnesses:
GEORGE L. NORRIS,
G. H. GERDING.